Nov. 24, 1959  H. S. VAN BUREN, JR  2,913,951
FASTENER WITH WASHER ASSEMBLED THERETO BY
A FRACTURABLE PROJECTION
Filed March 6, 1956
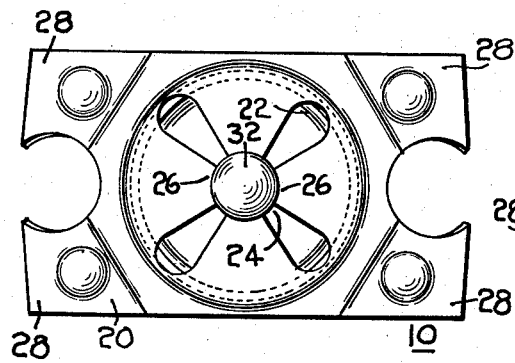
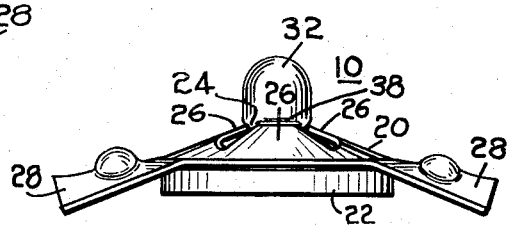
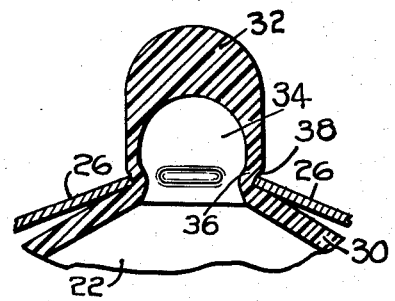
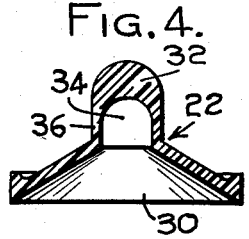
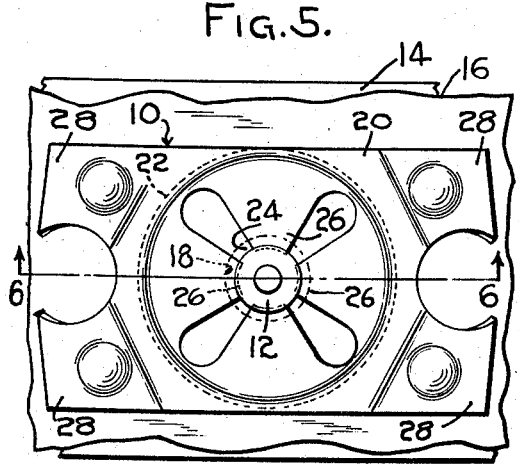
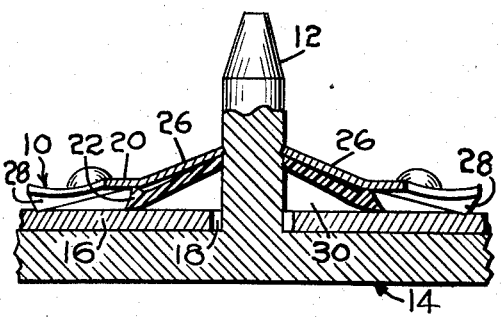
INVENTOR:
HAROLD S. VAN BUREN JR.,
BY Robert E Ross
ATTORNEY.

United States Patent Office 2,913,951
Patented Nov. 24, 1959

2,913,951

FASTENER WITH WASHER ASSEMBLED THERETO BY A FRACTURABLE PROJECTION

Harold S. Van Buren, Jr., Cambridge, Mass., assignor to United-Carr Fastener Corporation, Boston, Mass., a corporation of Delaware Application March 6, 1956, Serial No. 569,720

3 Claims. (Cl. 85—36)

This invention relates generally to fastening devices and has particular reference to a fastener for assembly onto a stud to retain a device thereon and to provide a seal about the stud.

In the construction of automobiles, household appliances, and many other devices, it is frequently necessary to attach a nameplate or other insignia to an exterior surface of a panel, such nameplates are commonly formed of die-cast metal and are provided with rearwardly projecting integral studs to extend through suitable panel openings. The studs are retained in the openings by means of various types of fastening devices, principally those utilizing the inclined tongue principle.

Although such devices hold the nameplates securely, they do not provide a seal of the stud opening, which has been found desirable to prevent the entrance of dust and moisture.

The object of this invention is to provide a fastening device which is adapted to engage a stud to secure an article thereto and to provide a water and dust seal about the stud.

A further object of the invention is to provide a fastening device in which a sheet metal stud-engaging portion is provided with a resilient sealing member retained therewith by the stud-engaging means.

A further object of the invention is to provide a fastening device in which a sheet metal stud-engaging portion is provided with a resilient sealing member with a shearable web extending into and engaged by the stud-engaging portion.

Other objects of the invention will be obvious from the following description of a specific embodiment thereof.

In the drawing:

Fig. 1 is a top plan view of a fastening device embodying the features of the invention;

Fig. 2 is a view in side elevation of the fastening device of Fig. 1;

Fig. 3 is an enlarged view in section of a portion of the assembly of Fig. 2;

Fig. 4 is a view in section of the sealing washer of the assembly of Fig. 2;

Fig. 5 is a top plan view of the fastening device of Fig. 2 assembled onto a stud of a nameplate or the like, retaining it in assembly with a panel; and Fig. 6 is a view in section taken on line 6—6 of Fig. 5.

Referring to the drawing, there is illustrated a fastening device 10, which is adapted for assembly onto a stud 12 of a nameplate 14 or the like to retain on a panel 16.

The nameplate 14 may be formed of die-cast metal, plastic, or other material, with studs 12 projecting from the rear side thereof through suitable apertures 18 in the panel.

The fastening device 10 comprises generally a sheet metal stud-engaging member 20 and a resilient sealing washer 22 assembled therewith. The sheet metal member 20 comprises generally a stud-receiving opening 24, an upwardly and inwardly extending group of spring tongues 26 disposed about the opening and biting into engagement with the stud, and laterally extending portions 28 which extend downwardly to bear against the panel.

The resilient sealing washer 22 is composed of a deformable material such as rubber or plastic and in the preferred embodiment has a body 30 which is generally conical in shape with a nib 32 projecting upwardly from the apex of the body into the stud-receiving opening 24.

In the illustrated embodiment the nib 32 has an opening 34 in the lower portion which extends through the body 30 to the concave lower side thereof and forms a relatively thin peripheral wall 36 at the lower end of the nib. As illustrated in Fig. 3, the nib 32 is larger than the stud-receiving opening 24, hence, when the washer is assembled with the sheet metal member, the inclined tongues engage the exterior surface of the peripheral wall 36 and pinch it in slightly, forming a shoulder 38 which assists in retaining the parts in assembly.

The fastener 10 is assembled onto the stud 12 in the usual manner by forcing it over the stud so that the inclined tongues dig into the stud. During such assembly, the stud, in passing through the washer, breaks off the nib at the junction of the peripheral wall with the body portion. The diameter of the opening 34 in the nib is less than the diameter of the stud 12, hence, after assembly of the fastener onto the stud, the stud is gripped tightly by the washer, and the washer is flattened down against the panel, thereby securely sealing the aperture 18 against the entrance of dust and moisture.

Although in the illustrated embodiment the washer is conical in shape to generally conform to the shape of the central portion of the sheet metal portion of the fastener, it will be understood that other shapes may be desirable for fasteners of different configurations. The principles of the invention are also adapted for use with sheet metal members having a thread-like helix in place of the inclined tongues. In some cases the nib 32 may be solid with a shoulder formed about the outer surface in the molding process.

Since certain other obvious changes may be made in the device without departing from the scope of the invention, it is intended that all matter contained herein be interpreted in an illustrative and not in a limiting sense.

I claim:

1. A pre-assembled fastening device for attachment to a stud comprising a stud engaging member having a central apertured portion, said apertured portion having stud-engaging means for receiving and engaging a stud from one side thereof, and a resilient sealing washer disposed on said one side of the apertured portion, said sealing washer having a centrally disposed closed end, substantially cylindrical, fracturable nib projecting into and through said stud engaging means, said nib being engaged and compressed by the stud-engaging means thereby retaining the washer in assembly with said stud-engaging means, said nib having an internal diameter less than that of the stud to be inserted.

2. A pre-assembled fastening device for attachment to a stud to secure an article thereto and to provide a seal about the stud comprising a sheet metal member having a central apertured portion therein, said apertured portion having an upwardly inclined stud-engaging portion disposed therearound for receiving and engaging a stud from one side, and a resilient sealing washer assembled on said one side thereof, said sealing washer being of generally conical shape and having a closed end, substantially cylindrical, fracturable nib projecting from the apex thereof into and through the stud-engaging means, said nib being engaged and compressed by the upwardly inclined stud-engaging portion thereby retaining the washer in assembly therewith, said nib having an internal diameter less than that of the stud to be inserted, 3. A fastening device as set forth in claim 1 in which the nib has a hollow lower portion to facilitate separation of the nib from the conical portion by a pinching operation against the central apertured portion when the fastener is inserted onto the stud.

References Cited in the file of this patent

UNITED STATES PATENTS

| | | |
|---|---|---|
| 2,316,974 | Risley | Apr. 20, 1943 |
| 2,417,262 | Morehouse | Mar. 11, 1947 |
| 2,452,184 | Cole | Oct. 26, 1948 |
| 2,697,873 | Cooke | Dec. 28, 1954 |
| 2,709,290 | Rosenthal | May 31, 1955 |
| 2,754,717 | Becker | July 17, 1956 |
| 2,759,390 | Edwards | Aug. 21, 1956 |
| 2,761,349 | Heller | Sept. 4, 1956 |
| 2,775,917 | Ferguson | Jan. 1, 1957 |
| 2,826,435 | Schustack | Mar. 11, 1958 |
| 2,851,079 | Heller | Sept. 9, 1958 |